United States Patent
Auffret et al.

(10) Patent No.: US 8,061,335 B2
(45) Date of Patent: Nov. 22, 2011

(54) INTERNAL COMBUSTION ENGINE COMPRISING AN EXHAUST GAS RECIRCULATION SYSTEM

(75) Inventors: Nicolas Auffret, Lyons (FR); Romain Montelimard, Saint Etienne (FR)

(73) Assignee: Renault Trucks, St. Priest (FR)

( * ) Notice: Subject to any disclaimer, the term of this patent is extended or adjusted under 35 U.S.C. 154(b) by 318 days.

(21) Appl. No.: 12/444,433

(22) PCT Filed: Oct. 24, 2006

(86) PCT No.: PCT/IB2006/003991
§ 371 (c)(1),
(2), (4) Date: Apr. 6, 2009

(87) PCT Pub. No.: WO2008/050178
PCT Pub. Date: May 2, 2008

(65) Prior Publication Data
US 2010/0095941 A1    Apr. 22, 2010

(51) Int. Cl.
*F02M 25/07* (2006.01)
*F02B 29/04* (2006.01)

(52) U.S. Cl. ................................. 123/568.12
(58) Field of Classification Search .............. 123/568.12
See application file for complete search history.

(56) References Cited

U.S. PATENT DOCUMENTS

| | | | |
|---|---|---|---|
| 3,355,877 A * | 12/1967 | Chaffiotte | 60/599 |
| 5,802,846 A | 9/1998 | Bailey | |
| 6,009,709 A * | 1/2000 | Bailey | 123/568.12 |
| 6,324,846 B1 | 12/2001 | Clarke | |
| 6,360,732 B1 | 3/2002 | Bailey et al. | |
| 6,877,317 B2 * | 4/2005 | Kurihara et al. | 60/612 |
| 6,918,251 B2 * | 7/2005 | Yanagisawa et al. | 123/568.12 |
| 7,059,308 B2 * | 6/2006 | Eitel et al. | 123/568.12 |

(Continued)

FOREIGN PATENT DOCUMENTS
DE    10331187 A1    2/2005
(Continued)

OTHER PUBLICATIONS
International Search Report for corresponding International Application PCT/IB2006/003991.

*Primary Examiner* — Stephen K Cronin
*Assistant Examiner* — Arnold Castro
(74) *Attorney, Agent, or Firm* — WRB-IP LLP

(57) ABSTRACT

This internal combustion engine includes a plurality of cylinders, an air intake line, and an exhaust line. The internal combustion engine also includes a turbocharging system having at least one compressor stage and intake air cooling arrangement having at least one charge air cooler located upstream from the intake manifold. The internal combustion engine further includes an exhaust gas recirculation (EGR) line rerouting a portion of the engine's exhaust gas into the air intake line at a point located upstream from the at least one charge air cooler. This engine therefore uses an heat exchanger to cool the EGR gas. Thus, EGR gas mixed with intake air flows through at least one change air cooler before entering the engine cylinders. The efficiency of this cooler—generally of the air/water type—makes it possible to significantly decrease the EGR gas temperature before it enters the cylinders. Less cooling power from the engine cooling system is required to cool down the EGR gas as fresh intake air is used as a cooling medium in the heat exchanger.

11 Claims, 2 Drawing Sheets

U.S. PATENT DOCUMENTS

| | | | |
|---|---|---|---|
| 7,210,468 B1 * | 5/2007 | Saele | 123/568.12 |
| 7,377,270 B2 * | 5/2008 | Duffy et al. | 123/568.12 |
| 7,536,998 B2 * | 5/2009 | Held et al. | 123/542 |
| 2004/0194463 A1 * | 10/2004 | Yanagisawa et al. | 60/605.2 |
| 2005/0199229 A1 * | 9/2005 | Eitel et al. | 123/568.12 |
| 2010/0064685 A1 * | 3/2010 | Auffret et al. | 123/568.12 |
| 2010/0071675 A1 * | 3/2010 | Geskes et al. | 123/568.12 |

FOREIGN PATENT DOCUMENTS

| | | |
|---|---|---|
| EP | 0718481 A2 | 6/1996 |
| EP | 1464823 A | 10/2004 |
| EP | 1586842 A | 10/2005 |
| EP | 1674710 A | 6/2006 |
| WO | 2005073536 A | 8/2005 |

* cited by examiner

INTERNAL COMBUSTION ENGINE COMPRISING AN EXHAUST GAS RECIRCULATION SYSTEM

BACKGROUND AND SUMMARY

The present invention relates to an internal combustion engine comprising an exhaust gas recirculation system, especially an engine dedicated to industrial applications.

In many countries, environmental regulations impose an upper limit in complete powertrain NOx (nitrogen oxide and nitrogen dioxide) emissions, and in future regulations, this limit will again be reduced. One of the conventional ways of decreasing the level of NOx emissions in internal combustion engines is to recirculate a portion of the exhaust gas back to the engine cylinders. This results in lowering the peak combustion temperatures and, as a consequence, limits NOx generation as NOx is generated by oxygen and high temperature. Cooling the exhaust gas recirculation (EGR) gas before reintroduction into the engine further reduces NOx emissions as this allows the introduction into the cylinders of a greater mass of exhaust gas and increases air and fuel mixture heat capacity.

To meet the current regulations, a typical internal combustion engine can comprise as depicted on FIG. 1:
- an air intake line 100 carrying intake air towards at least one engine intake manifold 101 connected to each cylinder 102, said air intake line 100 including an upstream low pressure compressor 103 and a downstream high pressure compressor 104 as well as a heat exchanger (also called charge air cooler) 105 (using the coolant of the engine cooling system) located between the high pressure compressor 104 and the intake manifold 101;
- an exhaust line 106 having at least one exhaust manifold 107 collecting the exhaust gas formed in each cylinder 102; said exhaust line 106 can include two turbines 108, 109 driven by the exhaust gas flowing from the exhaust manifold 107, each turbine being mechanically connected to one of the compressors 103, 104;
- an exhaust gas recirculation (EGR) line 110 whose inlet is connected to the exhaust line 106 and whose outlet comes out in an EGR mixer 111 connected to the air intake line 100, before the intake manifold 101 and after the charge air cooler 105, whereby part of the exhaust gas is mixed with intake air and then reintroduced into the engine cylinders 102.

A control valve 113 also referred to as EGR valve regulates the flow of exhaust gas rerouted from the exhaust manifold 107 into the intake manifold 101.

In such a known engine, the EGR gas is cooled before entering the cylinders 102 by means of an EGR cooler 112 located in the EGR line 110; this cooler 112 is usually an air/liquid heat exchanger using the coolant liquid of the engine cooling system.

Consequently, the heat transferred from the hot exhaust gas to the coolant can be significant, which can be detrimental to the cooling capacity of the engine cooling system.

Tighter NOx emission regulations will therefore result in vehicle cooling systems needing more cooling power to cope with the extra demand of cooling the EGR gas. Coolant pump design could also be problematic, and fuel consumption could be significantly increased which is not desired. Prior documents such as U.S. Pat. No. 6,360,732 tackle the problem of EGR gas temperature by providing an EGR system whereby the EGR gas flows through an air/air cooler located in the EGR line; the coolant used is a part of intake air derived from the air intake line through a cooling branch whose inlet is located between the charge air cooler (i.e. the air/liquid heat exchanger located in the air intake line) and the intake manifold. The EGR gas then comes out in an EGR/intake air mixer located in the air intake line just before the intake manifold and after the charge air cooler. Finally, this gas is reintroduced into the engine cylinders.

This disposition is not entirely satisfactory largely because intake air used to cool the EGR gas is taken after the charge air cooler.

First of all, due to the poor efficiency of the air/air EGR cooler, and although intake air has been first cooled in the air/liquid heat exchanger, the temperature of EGR gas flowing out of the EGR cooler towards the intake manifold can be too high to significantly reduce NOx production. Moreover, with this disposition, the intake air is first cooled in the air/water heat exchanger and then warmed up in the air/air EGR cooler.

Consequently, even if the warmed air is reintroduced into the exhaust system between the two turbines, i.e. its energy is given back to the turbocharging system through the second turbine, the thermal load on the engine coolant is not minimized, and the global thermal functioning is not fully optimized. Additionally, the pressure difference between charged air after the most downstream compressor and exhaust gas between the two turbines can be very high, especially at low engine speed and high loads. Consequently, the intake air can flow very fast: its residence time can be too low, and so can the air/air EGR cooler efficiency. It therefore appears that there is room for improvement in the exhaust gas recirculation system in internal combustion engines.

It is desirable to provide an improved internal combustion engine provided with an exhaust gas recirculation system, which can overcome the drawbacks encountered in current engines.

It is also desirable to provide an engine with a better engine thermodynamic efficiency. It is also desirable to provide an EGR system which does not have an impact on the engine cooling system, or at least have a lesser impact.

Thus the present invention provides an internal combustion engine that comprises a plurality of cylinders, an air intake line capable of carrying intake air towards an engine intake manifold, and an exhaust line capable of collecting exhaust gas from an exhaust manifold. The internal combustion engine also comprises a turbocharging system having at least one compressor stage capable of compressing intake air entering the intake manifold, and intake air cooling means having at least one charge air cooler located upstream from the intake manifold. The internal combustion engine further comprises an exhaust gas recirculation (EGR) line rerouting a portion of the engine's exhaust gas into the air intake line at a point located upstream from the at least one charge air cooler.

What is achieved by the invention is an engine having an EGR system whereby less cooling power from the engine cooling system is required to cool down the EGR gas.

Thus, after being mixed with intake air in the air intake line, EGR gas flows through at least one heat exchanger (i.e. at least one charge air cooler) before entering the engine cylinders. The efficiency of this cooler—generally of the air/liquid type—makes it possible to significantly decrease the EGR gas temperature before it enters the cylinders.

Thanks to the invention, i.e. the location of the connection between the EGR line outlet and the air intake line, it is possible to reach lower intake temperatures in the intake manifold. As a consequence, at the end of the combustion process, exhaust temperature will be lower, and so will the temperature of EGR gas carried by the EGR line. Heat transferred to the coolant of the engine cooling system will be lower, and a better trade-off will be reached.

A further advantage of the invention is that the invention makes it possible to achieve a homogeneous intermixing of fresh intake air and EGR gas as EGR gas is mixed with fresh intake air upstream from the charge air cooler. Therefore, the mix of fresh intake air and EGR gas can be homogenized during its residence time in the cooler.

In an advantageous way, the internal combustion engine further comprises a cooling branch deviating a portion of the intake air from a point of the air intake line located downstream from at least one compressor towards an EGR cooler thermally connected to said EGR line.

According to this aspect of the invention, a fraction of the fresh intake air is used as a coolant mean to reduce the EGR gas temperature. Unlike most conventional EGR system where EGR gas is cooled through a liquid to air cooler which proves to be a significant and undesirable load on the vehicle cooling system, the invention makes provision for an EGR system whereby the EGR gas is cooled by a fraction of the fresh intake gas.

Consequently, since EGR gas has already been cooled through the EGR cooler by means of part of the intake air, the load on the engine cooling system is lowered. In this embodiment, the invention makes it possible to spare the EGR water—air cooler that is found on a traditional EGR system and that can be a significant overload on the vehicle cooling system.

It can be mentioned that the portion of intake air that is used to cool the EGR gas does not circulate through the charge air cooler located just upstream from the intake manifold. Therefore, the portion of intake air that is used to cool the EGR gas does not itself undergo a cooling stage in the charge air cooler located just upstream from the intake manifold; this proves to be beneficial in so far as it does not overload the vehicle cooling system.

Advantageously, the engine according to the invention can further comprise a cooling branch outlet connected to the exhaust line upstream from at least one turbine.

In other words, the fraction of fresh intake air that is used to cool down the EGR gas is rerouted to the vehicle exhaust line where it can contribute to drive the turbine together with the exhaust gas.

In this aspect of the invention, the cooling portion of intake air flowing through the EGR cooler may be slightly hotter than in the prior art, and consequently the EGR gas may be cooled down slightly less, but more energy is recovered in the turbine thanks to the intake air returning into the exhaust line.

According to a first embodiment of the invention, the cooling branch inlet can be connected to the air intake line downstream from the at least one compressor or from the compressor situated most downstream.

This disposition is particularly adapted to engine low load operative conditions, when pressure difference between charged air and exhaust gas at the outlet of the cooling branch is moderate. According to this arrangement, the fraction of intake air that is deviated into the EGR cooler is compressed by at least one compressor—and usually two compressors in the case of a two stage compressor system—and therefore exhibits a pressure that is sufficient to establish a significant pressure difference between charged air and exhaust gas. Advantageously, the air intake line of the internal combustion engine can suitably comprise at least a low pressure compressor and a high pressure compressor located downstream from the low pressure compressor.

According to a second embodiment of the invention, the cooling branch inlet can be located in the air intake line between the low pressure and the high pressure compressors.

This disposition is more adapted to high load operative conditions, when the pressure difference between charge air and exhaust gas at the outlet of the cooling branch can be high. In that case, charge air is picked up between the two compressors and carried towards the EGR air to air cooler. Pressure difference between the inlet and the outlet of the cooling branch is then low enough to allow intake air through the EGR cooler to flow at a speed that enables the residence time of intake air in the EGR cooler to grant an adequate cooling of the EGR gas.

Furthermore, intake air cooling means can comprise a further charge air cooler located between the low pressure and the high pressure compressors, the cooling branch inlet being connected to the air intake line upstream from said further intake cooler.

According to a third embodiment of the invention, the cooling branch comprises a first conduit whose inlet is connected to the air intake line downstream from the high pressure compressor and upstream from the charge air cooler, a second conduit whose inlet is connected to the air intake line between the low pressure and the high pressure compressors, and a valve connected to the outlets of the first and second conduits, designed to let air flow from one of said conduits through the EGR cooler towards the exhaust line. In other words, air from the air intake line can flow through the EGR cooler from one point or another point of the air intake line. By controlling the valve, it is possible to use whichever solution is more efficient.

In an advantageous way, the internal combustion engine comprises controlling means for driving the valve depending on the engine operating conditions, to make air flow from the appropriate one of said conduits towards the exhaust line. Thus, the EGR cooling system is optimized depending on the engine operating conditions.

The EGR line outlet can be connected to the air intake line downstream from the high pressure compressor and downstream from the cooling branch inlet connected to the air intake line. With this disposition, the EGR conduits are shorter, the engine being less expensive and more compact. Alternatively, the EGR gas may be reintroduced further upstream, which has the advantage of a better mixing of EGR gas and intake air, and of a better cooling of EGR gas since it may flow through more coolers. Besides, the exhaust line can comprise at least two turbines each mechanically connected to one of the compressors, the outlet of the cooling branch being connected to the exhaust line downstream from the turbine located most upstream.

In an advantageous way, the charge air coolers are operated by the engine cooling system, contrary to the EGR cooler, which is operated by intake air.

These and other advantages will become apparent upon reading the following description in view of the drawing attached hereto representing, as non-limiting examples, embodiments of an engine according to the invention.

BRIEF DESCRIPTION OF THE DRAWING

The following detailed description of several embodiments of the invention is better understood when read in conjunction with the appended drawing being understood, however, that the invention is not limited to the specific embodiments disclosed. In the drawing.

DETAILED DESCRIPTION

Figure 2:
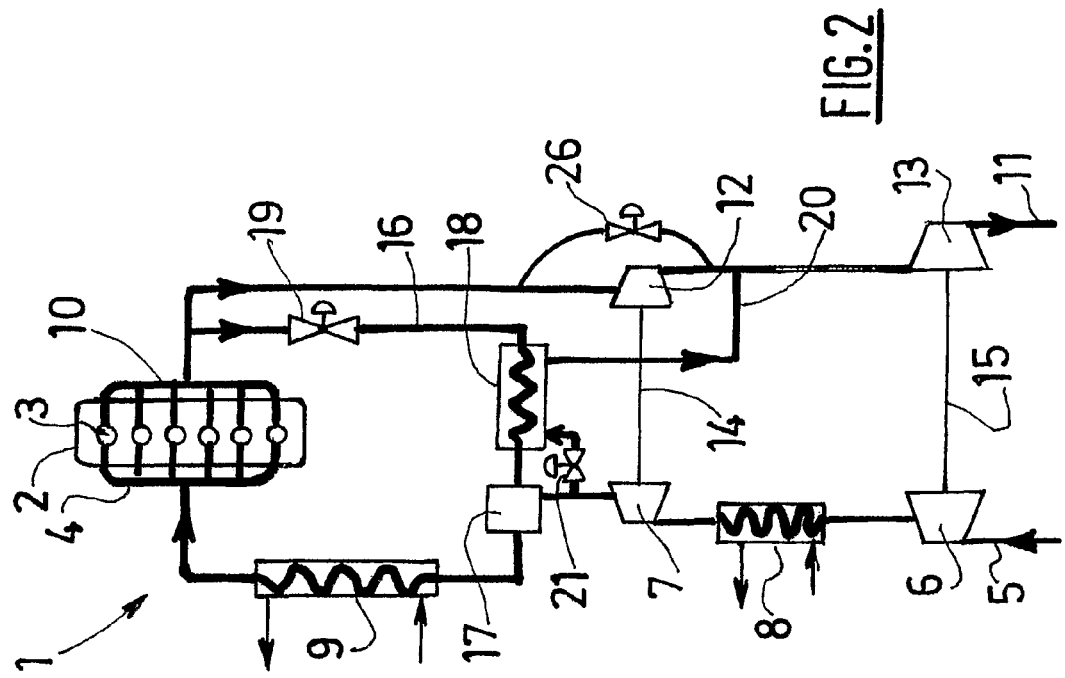
FIG. 2 is a schematic drawing of an internal combustion engine according to a first embodiment of the invention.
Figure 1:
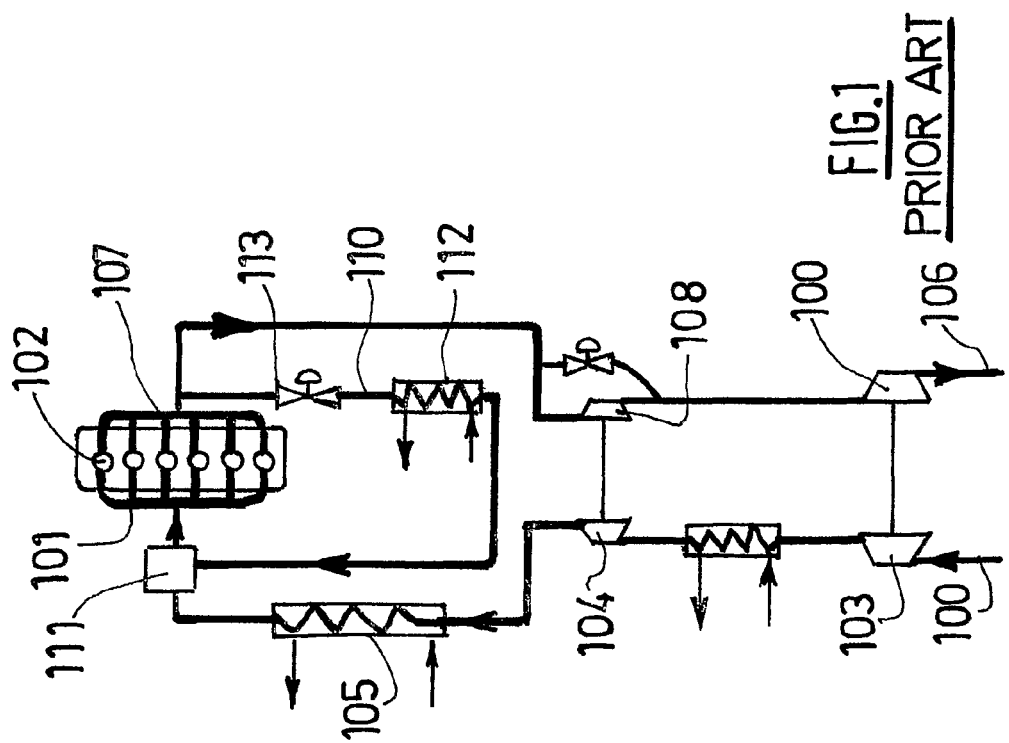
FIG. 1 is a schematic drawing of an internal combustion engine of the prior art.

As depicted on FIG. 2, an internal combustion engine I typically comprises an engine block 2 defining a plurality of cylinders 3, namely six cylinders in the embodiments illustrated in the figures. However any conventional combustion engine may use the invention.

Intake air is carried towards an intake manifold 4 feeding the cylinders 3 through an air intake line 5. The air intake line 5 can include a first compressor 6, which is a low pressure compressor, and a second compressor 7, which is a high pressure compressor, located downstream from the first compressor 6. An air intake cooler 8 which can suitably use the coolant of the vehicle cooling system, is introduced between the two compressors 6, 7. The air intake line 5 can further comprise a charge air cooler 9, which can also suitably use the coolant of the vehicle cooling system; the air cooler can be located between the second compressor 7 and the intake manifold 4.

Exhaust gas formed in each cylinder 3 is collected by an exhaust manifold 10 and then carried through an exhaust line 11 towards the atmosphere. The exhaust line 11 can suitably comprise two successive turbines 12, 13 driven by the exhaust gas; each turbine 12, 13 is mechanically connected to one of the compressors 7, 6 by means of a corresponding shaft 14, 15

The turbine 12 is further equipped with a waste gate system 26 for discharging downstream of the turbine 12 a portion of the exhaust gas that would otherwise pass through the wheel of turbine 12, when needed. The engine 1 illustrated is thus of the two-stage turbocharger type.

However, other implementations can be used. For example, the air intake line may include an intermediate compressor between compressors 6, 7, and/or the exhaust line may comprise only one turbine connected to a single variable geometry compressor. The engine 1 is further provided with an exhaust gas recirculation (EGR) system whose aim is to decrease NOx emissions.

The EGR system can first comprise an EGR line 16 whose inlet is connected to the exhaust line 11, just downstream from the exhaust manifold 10 or directly to the exhaust manifold 10, and whose outlet comes out in an EGR mixer 17, connected to the air intake line 5, where the EGR gas mixes with intake air. Consequently, the EGR line 16 carries a part of the exhaust gas—namely the EGR gas—from the exhaust line 11 back to the air intake line 5 and to the engine cylinders 3. Before entering the EGR mixer 17, EGR gas flows through an EGR cooler 18 which importantly is an air/air heat exchanger. Besides, a valve 19 regulates the flow of gas in the EGR line 16, depending on the engine operating point and on the EGR gas flow needed to reach the NOx emission limit.

The EGR system can also comprise a cooling branch 20 whose inlet is connected to the air intake line 5 and whose outlet is connected to the exhaust line 11, between the two turbines 12, 13 as this appears in FIG. 2. Alternatively, the cooling branch 20 outlet could be connected to the exhaust line 11 upstream from turbine 12 (not shown) or downstream from turbine 13 (not shown). The cooling branch 20 carries a part of the intake air from the air intake line 5 through the EGR cooler 18, thereby cooling down the EGR gas before it is reintroduced into the air intake line 5. The cooling branch 20 is also provided with a valve 21 in order to regulate the flow of intake air.

In the embodiment described in connection with FIG. 2, the cooling portion of intake air is derived downstream from the high pressure compressor 7 but upstream from the charge air cooler 9, and upstream from the EGR mixer 17. This arrangement can be particularly adapted to low load operative conditions. In comparison with prior art solutions, it makes it possible to lower the thermal load of the coolant medium and to lower the intake temperature, and thus also to lower the exhaust and EGR temperatures.

Figure 3:
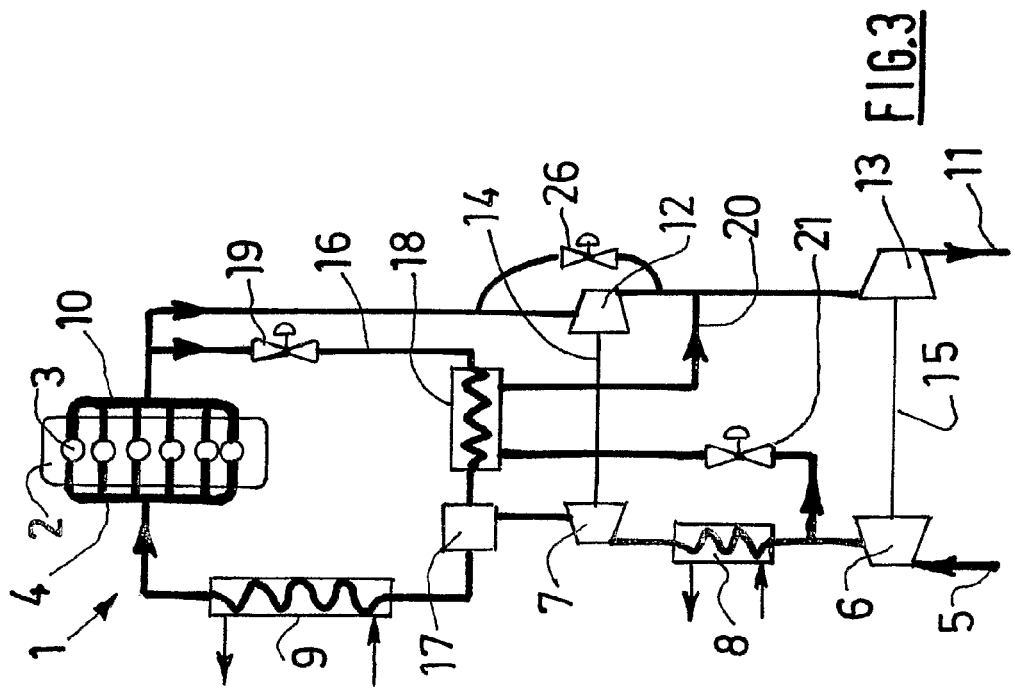
FIG. 3 is a schematic drawing of an internal combustion engine according to a second embodiment of the invention.

In a second embodiment, illustrated in FIG. 3, the cooling portion of intake air is derived downstream from the low pressure compressor 6 but upstream from charge air cooler 8, i.e. just after the low pressure compressor 6.

This arrangement, which can be more adapted to high load operating conditions, has the following advantage: because of the low pressure difference between the cooling branch 20 inlet and outlet, intake air flows slower through the EGR cooler 18 and provides a better cooling of EGR gas, improving this air/air cooler efficiency. This result has been confirmed by simulation for low engine speeds.

Figure 4:
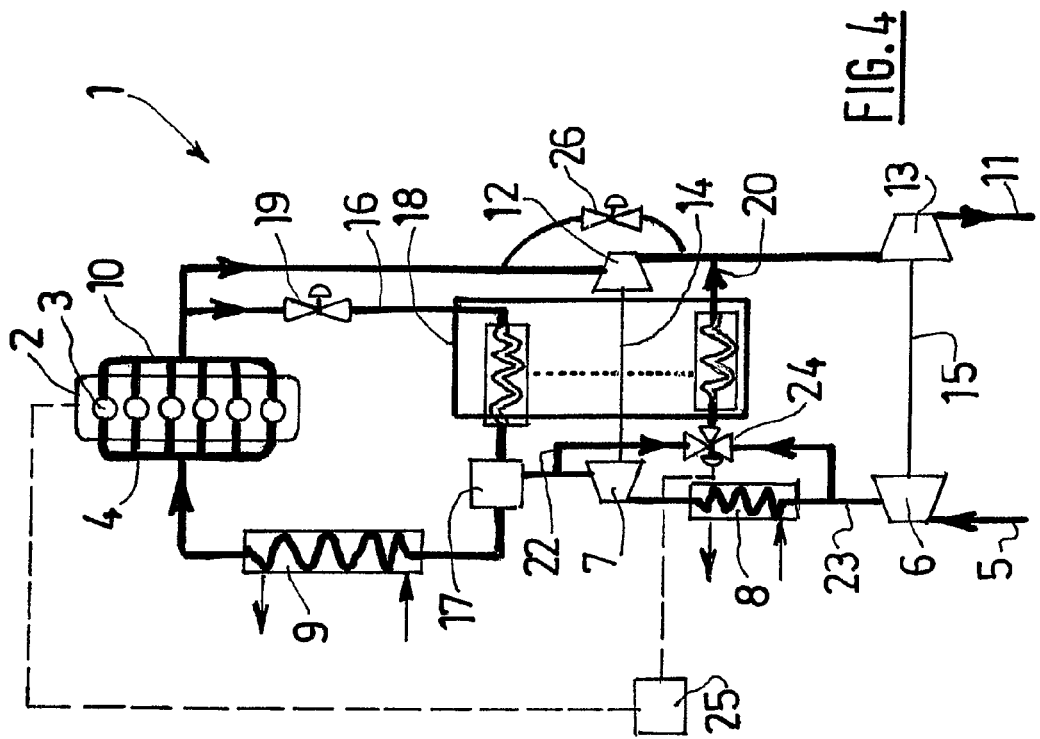
FIG. 4 is a schematic drawing of an internal combustion engine according to a third embodiment of the invention.

FIG. 4 shows a third embodiment, where the cooling branch 20 comprises a first conduit 22 whose inlet is connected to the air intake line 5 between the high pressure compressor 7 and the EGR mixer 17, and a second conduit 23 whose inlet is connected to the air intake line 5 between the low pressure compressor 6 and the charge air cooler 8. A multifunctional bypass valve 24, connected to the outlets of the first and second conduits 22, 23, let the intake air flow from one of said conduits through the EGR cooler 18 towards the exhaust line 11. The engine 1 may suitably comprise a controller 25 for driving the valve 24 depending on the engine operating conditions: anytime, intake air flowing through the EGR cooler 18 is therefore picked from the appropriate location of the air intake line 5 to achieve an adequate cooling of EGR gas and a satisfactory thermodynamic balance.

With this arrangement, the EGR system works better from a thermodynamic point of view, whatever the engine operating conditions. At low load operative condition, for example, first conduit 22 is preferred to carry intake air to EGR cooler 18, whereas at high load operative conditions, air is preferably collected between low pressure compressor 6 and intake cooler 8, through second conduit 23. Controlling the various valves makes it possible to use one or the other solution depending on the operating conditions.

In particular, in order to optimize the EGR cooler 18 efficiency, one or the other solution is used to always get the most efficient pressure difference possible between the inlet and the outlet of the cooling branch 20. Preferably, this pressure difference must not be too high, which would result in a too short intake air residence time in the EGR cooler 18, and not too low, which would entail a too small mass of intake air flowing through the EGR cooler 18. For example, when pressure after the low pressure compressor 6 is lower than pressure between the two turbines 12, 13, no heat exchange would be possible at all in the EGR cooler 18. Under that condition, intake air used to cool EGR gas would be taken from the air intake line 5 according to the first embodiment for a more efficient cooling.

Of course, the invention is not restricted to the embodiment described above by way of non-limiting example, but on the contrary it encompasses all embodiments thereof.

The invention claimed is:

1. An internal combustion engine having a plurality of cylinders comprising:

an air intake line capable of carrying intake air towards an engine intake manifold;

an exhaust line capable of collecting exhaust gas from an exhaust manifold;

a turbocharging system having at least one compressor stage driven by at least one turbine capable of compressing intake air entering the intake manifold;

intake air cooling means having at least one charge air cooler located upstream from the intake manifold; and an exhaust gas recirculation (EGR) line rerouting a portion of the engine's exhaust gas into the air intake line at a point located upstream from the at least one intake cooler wherein the internal combustion engine further comprises a cooling branch deviating a portion of the intake air from a point of the air intake line located downstream from at least one compressor towards an EGR cooler thermally connected to the EGR line, and wherein the air intake line comprises at least a low pressure compressor and a high pressure compressor located downstream from the low pressure compressor, and the cooling branch inlet is connected to the air intake line between the low pressure and the high pressure compressors.

2. The internal combustion engine according to claim 1, wherein it comprises a cooling branch outlet connected to the exhaust line upstream from at least one turbine.

3. The internal combustion engine according to claim 1, wherein the air intake line comprises at least a low pressure compressor and a high pressure compressor located downstream from the low pressure compressor.

4. The internal combustion engine according to claim 1, wherein intake air cooling means comprise a further intake cooler located between the low pressure and the high pressure compressors, a cooling branch inlet being connected to the air intake line upstream from the further intake cooler.

5. The internal combustion engine according to claim 1, wherein the air intake line comprises at least a low pressure compressor and a high pressure compressor located downstream from the low pressure compressor, and the cooling branch comprises:

a first conduit whose inlet is connected to the air intake line downstream from the high pressure compressor and upstream from the intake cooler;

a second conduit whose inlet is connected to the air intake line between the low pressure and the high pressure compressors; and a valve capable of directing the flow of air from one of the first conduit and second conduit towards the EGR cooler.

6. The internal combustion engine according to claim 5, wherein the engine further comprises controlling means for driving the valve depending on the engine operating conditions, to make air flow from the appropriate one of the first and second conduits towards the EGR cooler.

7. The internal combustion engine according to claim 1, wherein the EGR line outlet is connected to the air intake line downstream from the high pressure compressor and downstream from the cooling branch inlet connected to the air intake line.

8. The internal combustion engine according to claim 1, wherein the exhaust line comprises at least two turbines each mechanically connected to one of the compressors, the outlet of the cooling branch being connected to the exhaust line downstream from the turbine located most upstream.

9. The internal combustion engine according to claim 1, wherein the charge air coolers are operated by the engine cooling system.

10. An internal combustion engine having a plurality of cylinders comprising:

an air intake line capable of carrying intake air towards an engine intake manifold;

an exhaust line capable of collecting exhaust gas from an exhaust manifold;

a turbocharging system having at least one compressor stage driven by at least one turbine capable of compressing intake air entering the intake manifold;

intake air cooling means having at least one charge air cooler located upstream from the intake manifold;

an exhaust gas recirculation (EGR) line rerouting a portion of the engine's exhaust gas into the air intake line at a point located upstream from the at least one intake cooler; and a cooling branch outlet connected to the exhaust line upstream from at least one turbine.

11. An internal combustion engine having a plurality of cylinders comprising:

an air intake line capable of carrying intake air towards an engine intake manifold;

an exhaust line capable of collecting exhaust gas from an exhaust manifold;

a turbocharging system having at least one compressor stage driven by at least one turbine capable of compressing intake air entering the intake manifold;

intake air cooling means having at least one charge air cooler located upstream from the intake manifold; and an exhaust gas recirculation (EGR) line rerouting a portion of the engine's exhaust gas into the air intake line at a point located upstream from the at least one intake cooler wherein the internal combustion engine further comprises a cooling branch deviating a portion of the intake air from a point of the air intake line located downstream from at least one compressor towards an EGR cooler thermally connected to the EGR line, and wherein the EGR line outlet is connected to the air intake line downstream from the high pressure compressor and downstream from the cooling branch inlet connected to the air intake line.

* * * * *